United States Patent [19]

Moncourtois et al.

[11] Patent Number: 5,725,295
[45] Date of Patent: Mar. 10, 1998

[54] LIGHTING SYSTEM AND BOOTH

[75] Inventors: Dominique Moncourtois, Paris; Francis Vandenbussche, Vaucresson, both of France

[73] Assignee: Chanel S.A., Neuilly-sur-Seine, France

[21] Appl. No.: 692,447

[22] Filed: Aug. 5, 1996

[30] Foreign Application Priority Data

Nov. 8, 1995 [FR] France .................... 95 13222

[51] Int. Cl.$^6$ .................................................. F21V 7/04
[52] U.S. Cl. .................. 362/32; 362/128; 362/144; 362/135
[58] Field of Search ................... 362/32, 128, 129, 362/135, 141, 142, 144

[56] References Cited

U.S. PATENT DOCUMENTS

| | | | |
|---|---|---|---|
| 3,381,120 | 4/1968 | Fleisher et al. | 362/141 |
| 3,794,828 | 2/1974 | Arpino | 362/141 |
| 5,184,253 | 2/1993 | Hwang | 362/32 |
| 5,392,162 | 2/1995 | Glucksman | 362/142 |
| 5,508,892 | 4/1996 | Laczynski et al. | 362/32 |

FOREIGN PATENT DOCUMENTS

| | | | |
|---|---|---|---|
| 806912 | 10/1936 | France | 362/141 |
| 2437580 | 11/1975 | Germany | 362/32 |

*Primary Examiner*—Carroll B. Dority
*Attorney, Agent, or Firm*—Merchant, Gould, Smith, Edell, Welter & Schmidt

[57] ABSTRACT

A lighting booth for providing varying light conditions. The lighting booth includes a stand, a mirror mounted to the stand, and first and second panels mounted to the stand adjacent the mirror, each panel defining a plurality of apertures. The lighting booth further includes a lighting system having a plurality of light sources and an adjustable power source. Each light source is coupled with at least one aperture and with the adjustable power source for selecting the intensity of the light emitted thereby such that the light emitted by an outlet end of each bundle may be adjusted so as to provide selectable variation in lighting conditions.

17 Claims, 1 Drawing Sheet

LIGHTING SYSTEM AND BOOTH

Design patent application entitled "Lighting Booth and Mirror" filed Jun. 21, 1996 with the U.S. Patent and Trademark Office and having Ser. No. 29,056,069 is herein incorporated by reference.

BACKGROUND OF THE INVENTION

1. Field of the Invention

The present invention relates generally to lighting systems for providing various light conditions, and, more particularly, to lighting systems for lighting booths.

2. Description of Related Art

During a day, an object or landscape is subject to a variety of light conditions, including natural and artificial light. Natural light itself varies over the course of a day. For example, photographs taken of the same landscape at various times during the day have colors which vary significantly. Likewise, artificial light gives quite different illumination depending on the type of bulb. For example, an object illuminated by a halogen lamp will take on a significantly different hue or coloration than the same object illuminated by a neon bulb or other fluorescent bulb. Moreover, even within the same category of bulbs, the coloration of an object varies with the intensity of the light emitted by the incandescent filament. Fluorescent light tubes can also give different shades and coloration depending on the nature of the fluorescent layer and the glass used.

In certain fields, such as cosmetology, photography, cinematography, it is desirable to know how objects respond to different light conditions. In cosmetology, for instance, it is desirable to know how a face with make-up looks in various lighting. In photography or cinematography, for example, it is desirable to be able to light objects or landscapes differently in order to enhance their characteristics. Therefore, it is desired to have a lighting system providing the ability to recreate several common lighting conditions.

Prior attempts to provide lighting systems include systems utilizing fluorescent tubes, some of which being covered with blue, yellow, or red colored gelatin filters. These systems were undesirably bulky, provided poor illumination, and were not capable of producing many lighting conditions, for example, a light condition similar to that of the sun at its zenith.

Thus, there exists in the cosmetic, photographic, and cinema industries, an intensely felt need to provide a lighting system capable of reproducing many different lighting conditions. The present invention addresses this and other needs.

SUMMARY OF THE INVENTION

To overcome the limitations in the prior art, and to overcome other limitations that will become apparent upon reading and understanding the present specification, the present invention discloses a lighting booth and system capable of varying light conditions. The lighting booth includes a stand, a mirror mounted to the stand, and first and second panels mounted to the stand adjacent the mirror, each panel defining a plurality of apertures. The lighting booth further includes a lighting system having a plurality of light sources and an adjustable power source. Each light source is coupled with at least one aperture and with the adjustable power source for selecting the intensity of the light emitted thereby such that the light emitted by an outlet end of each bundle may be adjusted so as to provide selectable variation in lighting conditions.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figures 1, 2:
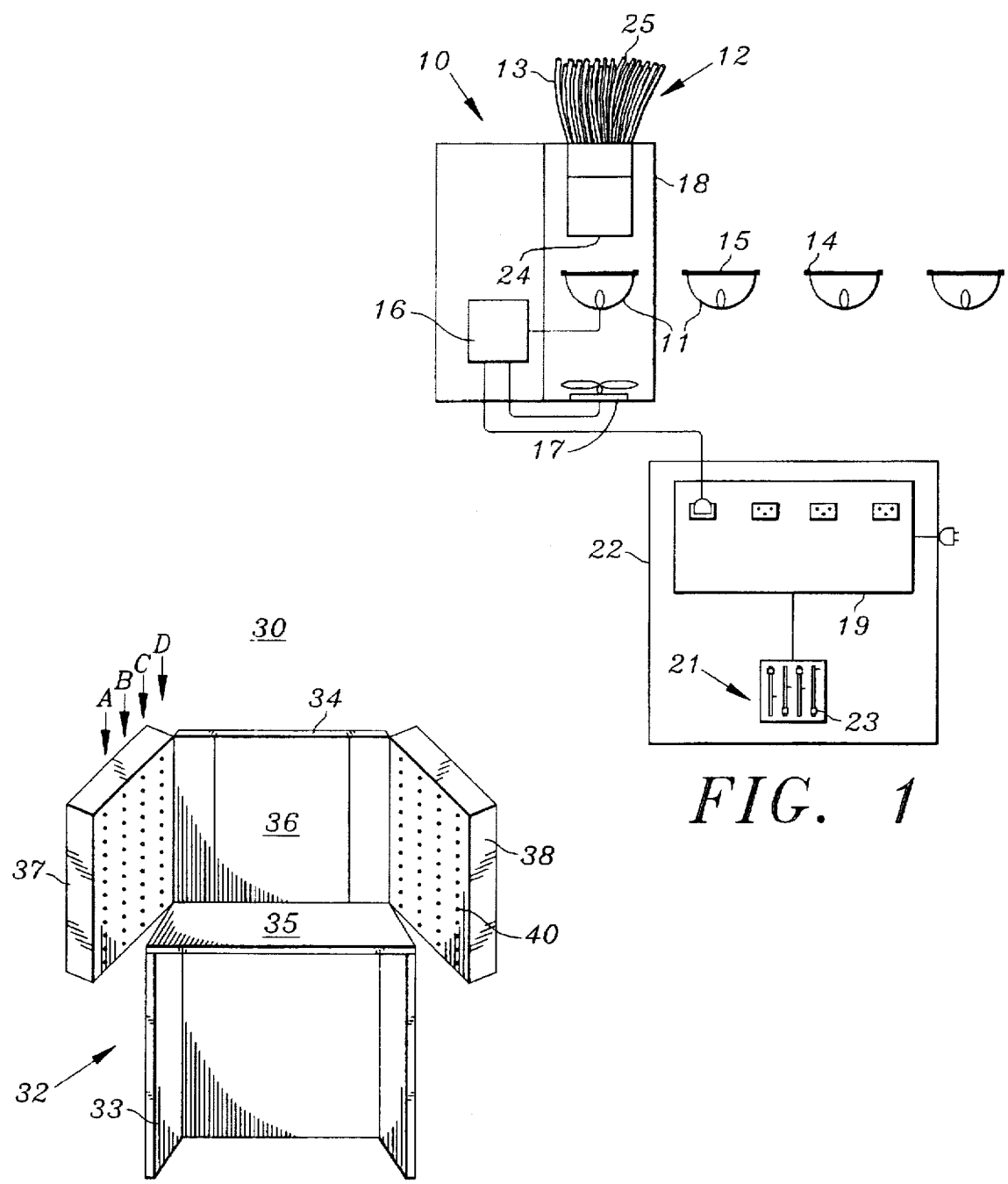
FIG. 1 illustrates an exemplary lighting device according to the present invention.
FIG. 2 illustrates an exemplary lighting booth according to the present invention.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

FIG. 1 illustrates an exemplary lighting device 10 according to the present invention. The lighting device 10 comprises four light units, each of which include a light generator 11 and a bundle 12 of optical fibers 13, and an adjustable electricity source 22. In the exemplary embodiment, three of the light units may include color filters 15. As will be described more fully hereinafter, adjustable electricity source 22 is connected to light generators 11 in order to vary the intensity of the light emitted by light generators 11. Light generators 11 are further coupled with optical fiber bundles 12 for transmitting light thereto. To simplify FIG. 1, the structure of only one light generator 11 is represented it is noted that lighting device 10 may include just one light unit or more than four light units, for example, two sets of four units, or eight units.

Light generators 11 are preferably white light generators such as halogen bulb dichroic lamps or quartz lamps. For example, the intensity of the light may be similar to that provided by a 50 Watt (W) halogen dichroic lamp, or a 90 W quartz bulb lamp. An exemplary quartz lamp is a boosted 90-watt lamp, sold by General Electric in its Quartz Line (R) Series, under reference EPV or MR16, designed for 14.5 V voltage and 90 W power.

Each bundle 12 of optical fibers 13 has a inlet end 24 and an outlet end 25. Inlet end 24 may be positioned adjacent to the outlet of a light generator 11 for receiving the light generated by the light generator 11. Outlet end 25 may be positioned wherever desired for emitting the light received at inlet end 24. For example, outlet end 25 of the optical fibers 13 may be attached to a panel (not shown in FIG. 1). Each bundle 12 may comprise optical fibers 13 having a diameter of 4.5 mm. For example, twenty-five optical fibers may be combined to form a bundle. Each optical fiber 13 may further be covered by a sheath. Exemplary optical fiber bundles 12 are DIA 24 B optical fiber bundles of the Mégolon or plastic PMMA type. The use of optical fibers provides exceptional illumination, for example, optical fibers can transmit light over long distances without any appreciable distortion or loss in intensity.

Color filters 15 may be provided such that three of the light units each transmit only one of the primary colors, red, blue, and yellow. Color filters 15 may be positioned between the outlet of light generators 11 and inlet end 14 of optical fiber bundles 12, as shown, or may be positioned at outlet end 25 of bundles 12. It is noted that each color filter 15 is configured to pass one of the primary colors and reject the other two, e.g., red filters reject blue and yellow. Exemplary color filters include Y52 yellow filters, R65 red filters, B46 medium blue filters. In the exemplary embodiment, three of the four light generators 11 are coupled with a color filter 15 such that one light generator 11 transmits red light to an associated optical fiber bundle 12, one transmits blue light, and one transmits yellow light, with the one light generator 11 not associated with a color filter 15 transmitting white light. It is noted that white is technically not a color, but will be considered as such for the purposes of explanation herein.

Color filters 15 may further include ultraviolet (UV) filters for filtering out UV radiation which may be produced by light generators 11. Moreover, in the exemplary embodiment, a UV filter is positioned in front of light generator 11 which is used to transmit white light. Lighting device 10 may include other correcting filters, such as 3000–5000K correctors, diffusion correctors, anti-heat correctors, or 4300–3200K correctors.

Color filters 15 may be made of glass and may include multiple layers. In the exemplary embodiment, color filters 15 are dichroic and square, having a size 4.5×4.5 mm to match the face of light generators 11.

In the exemplary embodiment shown, color filters 15 are attached to the outlet face of the light generators 11. In alternate embodiments, color filters 15 may be positioned at outlet end 25 of bundles 12. For supporting color filters 15, light generators 1 may be provided with filter supports 14 coupled thereto.

In the exemplary embodiment, adjustable electricity source 22 includes a graduator 19 and a control box 21. Graduator 29 may include a plurality of channels, with each channel being coupled with a light generator 11 for providing power to the associated light generator 11. The amount of power supplied to each light generator may be adjusted using control box 21 as described more fully below. In the exemplary embodiment, graduator 19 may be a single multichannel graduator, for example, a 4×2000 watt, resistive at low tension, multichannel, graduator, such as a Pulsar 4×5 ampere minipack, or may comprise multiple graduators, totalling four channels.

Control box 21 of variable electricity source 22 may include four adjustable, linear potentiometers having variable resistors. Each potentiometer may be coupled with a channel of graduator 19 for adjusting the power supplied by the channel of graduator 19 to its associated light generator 11. Control box 21 may be mounted on graduator 19 or remotely located and connected to graduator 29 via electrical cables. Control box 21 may include sliding contacts 23 for varying the resistance of the variable resistors and thereby controlling the power supplied to a light generator 11.

In this manner, the light intensity of each light generator 11 may be independently controlled. With independent control over the intensity of each of the light colors, all light conditions, both natural and artificial, can be provided. For example, lighting device 10 may simulate light conditions, such as those produced by the sun, a lamp, a wood fire, a candle, an oil lamp, a match, etc. Indeed, it is noted that it is the relative intensity of the four colors emitted that provide different types of light conditions.

Control box 21 may be provided with locations along the length of sliding contacts 23 for quickly identifying predetermined light conditions. For example a location along a given sliding contact 23 may indicate the appropriate setting for that sliding contact 23 to produce a desired light condition. Locations along each sliding contact may be calibrated together to produce a desired light condition. In alternate embodiments, control box 21 may be provided with press-button switches, or press-buttons coupled to the potentiometers for adjusting the resistors of the potentiometers to a desired resistance to produce a desired light condition. In other words, each press-button sets the resistances of the linear potentiometers to the correct setting for the desired light condition. Press-buttons enable a user to efficiently reproduce any of the types of lighting for which a presetting was made. In other embodiments, press-buttons may be combined with sliding contacts 23 in a single control box 21. Control box 21 may also be provided with a lights-off command or dimmer, for example, a set of locations or a press-button configured to dim or turn off light generators 11 in the exemplary embodiment, control box 21 is configured with ten predetermined settings.

Transformers 16 may be connected between graduator 19 and each light generator 11 for regulating the voltage and current supplied to each light generator 11. In the exemplary embodiment, lighting device 10 includes a corrected, boosted, 14 volt/105 watt transformer.

Lighting device 10 may also include fans 17 for ventilating the heat produced by the light generators 11, and thereby extending the life of a light generator 11. A fan 17 may be provided with each light generator 11 and may be powered through a transformer 16, as shown.

Turning now to FIG. 2, there is shown an exemplary lighting booth 30 for providing various light conditions. Lighting booth 30 includes a stand 32 housing two lighting systems (not shown in FIG. 2), two panels 37, 38 and a mirror 36. Panels 37, 38 and mirror 36 are mounted to an upright portion 34 of stand 32. Panels 37, 38 may be pivotally mounted, for example, on hinges, so as to open to different angles and, if desired, be closed over mirror 36. Stand 32 may also include a horizontal table top 35 on which, for example, makeup products may be placed. In addition, control boxes 21 of an adjustable power source may also be disposed on table top 35.

Each lighting system includes a plurality of light sources, such as light bulbs or optical fibers, and an adjustable power source, such as a variable electricity source 22 including a control box 21. In the exemplary embodiment, each lighting system is a lighting device 10, as described above.

Panels 37, 38 have front faces with each face having a plurality of apertures 40 and a substantially planar surface. Each light source may be coupled with at least one aperture. In the exemplary embodiment, panels 37, 38 contain outlet ends 25 of optical fibers 13, with each outlet end 25 being coupled with an aperture 40. For example, outlet ends 25 may be fixedly received by apertures 40, or output ends 25 may be mounted behind apertures 40 so that the light emitted from each outlet end 15 passes through a corresponding aperture 40. Outlet ends 25 of fibers 13 may be disposed parallel to each other, and perpendicular to the plane of the front face of panels 37, 38, for providing uniform illumination.

In the exemplary embodiment, each panel 37, 38 includes forty-eight (48) apertures 40 disposed in four columns A, B, C, D, and twelve rows. The spacing between apertures 40 may be on the order of five centimeters. It is noted that the number of apertures 40 on each panel 37, 38 may vary substantially depending on the particular application. For example, a portable lighting suitcases would require far fewer apertures compared to a commercial makeup booth. Thus, as many apertures 40 as desired may be provided for larger applications, such as in cinematography where a landscape or large object such as a ship or car is illuminated. In addition, the arrangement of apertures 40 may vary, for example, rather than being arranged in linear columns A, B, C, D, as shown, apertures 40 may be staggered such that in column A, apertures 40 in odd rows may be linearly arranged, in column B apertures 40 in even rows may be linearly arranged, etc. Circular or other arrangements of apertures 40 may be provided as well.

For increasing the uniformity of illumination, the light sources may be symmetrically arranged, with the colors mixed over the face of a panel 37, 38. In the exemplary embodiment, each column A, B, C, D may emit one color of light. For example, apertures of column A may be coupled with light sources emitting white light, apertures 40 of column B emitting blue light, column C yellow light, and column D red light.

In alternate embodiments, four light sources 13 emitting white light may be disposed in the first row, four light sources emitting red light in the second row, four light sources emitting yellow light in the third row, and so forth. Groups of light sources of the same color may be arranged in a square. Light sources may also be arranged to emit light in a given order in the first row, with the order rotating by one in successive rows, e.g., row one having the order of white, blue, yellow, red, row two having the order of blue, yellow, red, white, etc. Another arrangement may include one row with white light in columns A and C and blue in columns B and D, and in the following row, red in columns A and C and yellow in columns B and D. An endless number of other arrangements are, of course, possible, however, it is not desirable to use, for example, the upper half of a panel for one color, the lower half of the panel for another color.

In the exemplary embodiment, each lighting system controls the lighting of a corresponding one of panels 37, 38. By using two lighting systems, separated left-right, lighting booth 30 may, for example, illuminate the left side of a face differently than the right side of a face. Furthermore, if desired, only one side of a face may be lighted. It should be appreciated that the lighting booth may include only one lighting system for controlling both panels 37, 38, if so desired. In addition, in alternate embodiments, each lighting system may include less than four light units, in other words, less than four colors of light. Less colors may be sufficient to provided certain lighting arrangements.

For aesthetic reasons, the lighting systems may be entirely hidden from view, except for a control box 21 and the light sources, such as the light bulbs or output ends 25 of optical fibers 13. For example, lighting systems may be housed within base portion 33, upright portion 34, or panels 37, 38.

Lighting device 10 may be employed in a number of alternative embodiments with such embodiments varying widely in size. For example, lighting device 10 may be adapted for small systems, such as, for example, a portable lighting suitcase for makeup, or large systems, such as large panels for lighting a landscape or large object.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A lighting booth, comprising:
   a stand;
   a mirror mounted to the stand;
   first and second panels mounted to the stand adjacent the mirror, each panel defining a plurality of apertures; and
   a lighting system including a plurality of light sources and an adjustable power source, each light source being coupled with at least one aperture, and each light source being coupled with the adjustable power source for selecting the intensity of the light emitted thereby such that the light emitted by an outlet end of each light source may be adjusted so as to provide selectable variation in lighting conditions.

2. A lighting booth as recited in claim 1, wherein the stand includes a base portion having a horizontal top, and an upright portion, the mirror and first and second panels being mounted to the upright portion.

3. A lighting booth as recited in claim 1, wherein the panels are pivotally mounted to the stand so as to open at a variety of angles and to close over the mirror.

4. A lighting booth according to claim 1, wherein the adjustable power source is independently coupled to each light source so that the intensity of light emitted by each light source may be independently adjusted.

5. A lighting booth according to claim 4, wherein the adjustable power source includes a control box having a plurality of potentiometers, each potentiometer being coupled to a light source for independently adjusting the intensity of light emitted by the light source.

6. A lighting booth according to claim 5, wherein each potentiometer includes a sliding contact and locations along the sliding contact for indicating the appropriate setting of the sliding contact to produce a desired light condition.

7. A lighting booth according to claim 6, wherein the locations along a sliding contact are calibrated with locations along other sliding contacts to produce a desired light condition.

8. A lighting booth as recited in claim 1, wherein the plurality of light sources comprise a first and a second plurality of light sources, the first plurality of light sources being coupled with the apertures of the first panel and the second plurality of light sources being coupled with the apertures of the second panel.

9. A lighting booth as recited in claim 8, comprising first and second lighting systems, the first lighting system being coupled with the first plurality of light sources and the second lighting system being coupled with the second plurality of light sources, each lighting system being coupled with a corresponding adjustable power source for independently varying the light emitted by the first and second plurality of light sources.

10. A lighting booth as recited in claim 9, wherein the first and second plurality of light sources each include at least two different colored light sources, each colored light source being independently coupled to the adjustable power source.

11. A lighting booth as recited in claim 10, wherein the colored light sources include a white light source, a blue light source, a red light source, and a yellow light source.

12. A lighting booth as recited in claim 1, wherein at least one panel comprises four columns of apertures.

13. A lighting booth as recited in claim 12, wherein the plurality of light sources include at least two different colored light sources, wherein the apertures of each column are all coupled to one colored light source.

14. A lighting booth as recited in claim 13, wherein the colored light sources include a white light source, a blue light source, a red light source and a yellow light source, the first column of apertures being coupled to the white light source, the second column of apertures being coupled to the blue light source, the third column of apertures being coupled to the yellow light source, the fourth column of apertures being coupled to the red light source.

15. A lighting apparatus, comprising:

a mirror;

a panel mounted adjacent the mirror, the panel having a surface defining a plurality of apertures, said apertures being arranged adjacent each other along a substantial portion of the panel surface in a plurality of directions; and a lighting system including a plurality of light sources and an adjustable power source having a plurality of potentiometers, each light source being coupled with at least one aperture, and each light source being independently coupled with one of the potentiometers of the adjustable power source to vary the intensity of the light emitted therefrom for providing various light conditions.

16. A lighting apparatus, comprising:

a cosmetic mirror;

a panel mounted adjacent the cosmetic mirror, the panel defining a plurality of apertures;

at least three light sources, each light source producing light of a different color, being coupled with an aperture to emit therefrom light for a user; and a controller independently coupled to each of the light sources such that a user can select one of a plurality of predetermined simulated lighting conditions.

17. A lighting apparatus according to claim 15, wherein said apertures are arranged on the panel surface along both a horizontal and a vertical direction.

* * * * *

UNITED STATES PATENT AND TRADEMARK OFFICE
CERTIFICATE OF CORRECTION

PATENT NO. : 5,725,295

DATED : March 10, 1998

INVENTOR(S) : Dominique Moncourtois, et al.

It is certified that error appears in the above-identified patent and that said Letters Patent is hereby corrected as shown below:

At column 3, line 43, "29" should read --19--.

At column 3, line 59, "29" should read --19--.

Signed and Sealed this

Fifteenth Day of December, 1998

*Attest:*

BRUCE LEHMAN

*Attesting Officer*     Commissioner of Patents and Trademarks